(12) United States Patent
Ito et al.

(10) Patent No.: US 6,280,059 B1
(45) Date of Patent: Aug. 28, 2001

(54) SPOTLIGHT SOURCE APPARATUS

(75) Inventors: Moriyuki Ito; Kazuhito Kawai, both of Shizuoka-ken (JP)

(73) Assignee: Hamamatsu Photonics K.K., Shizuoka-ken (JP)

( * ) Notice: Subject to any disclaimer, the term of this patent is extended or adjusted under 35 U.S.C. 154(b) by 0 days.

(21) Appl. No.: 09/509,767

(22) PCT Filed: Oct. 2, 1997

(86) PCT No.: PCT/JP97/03521

§ 371 Date: Mar. 31, 2000

§ 102(e) Date: Mar. 31, 2000

(87) PCT Pub. No.: WO99/17872

PCT Pub. Date: Apr. 15, 1999

(51) Int. Cl.[7] .................................... F21V 21/26
(52) U.S. Cl. .......................... 362/269; 362/270; 362/277; 362/282; 362/284; 362/278; 362/324; 362/551; 362/554
(58) Field of Search .................... 362/269, 270, 362/277, 278, 551, 552, 554, 580, 294, 373, 282, 322, 284, 324, 276; 313/113

(56) References Cited

U.S. PATENT DOCUMENTS

| | | | |
|---|---|---|---|
| 4,149,086 | 4/1979 | Nath | 250/504 |
| 5,369,557 | * 11/1994 | Ronney | 362/285 |
| 5,790,620 | * 8/1998 | Okazaki et al. | 376/305 |

FOREIGN PATENT DOCUMENTS

| | | |
|---|---|---|
| 59-25503 | 2/1984 | (JP) . |
| 3-35516 | 4/1991 | (JP) . |
| 5-3215 | 1/1993 | (JP) . |
| 5-22212 | 3/1993 | (JP) . |
| 6-160722 | 6/1994 | (JP) . |
| 8-94861 | 4/1996 | (JP) . |
| 8-94862 | 4/1996 | (JP) . |
| 8-94863 | 4/1996 | (JP) . |
| 8-94871 | 4/1996 | (JP) . |
| 8-94872 | 4/1996 | (JP) . |
| 8-184723 | 7/1996 | (JP) . |
| 9-281361 | 10/1997 | (JP) . |

* cited by examiner

Primary Examiner—Sandra O'Shea
Assistant Examiner—Bertrand Zeade
(74) Attorney, Agent, or Firm—Morgan, Lewis & Bockius LLP

(57) ABSTRACT

The present invention comprises a discharge lamp (2) for emitting light; a cold mirror (4), having an opening portion, for reflecting the light emitted from the discharge lamp; a reflecting mirror (10), located on the opening portion side of the cold mirror, for reflecting the light reflected by the cold mirror; a light-shielding drum (6) having a light emission port (8) for emitting the light reflected by the reflecting mirror; a stepping motor 14 for driving the reflecting mirror and the light-shielding drum to rotate about an optical axis of the discharge lamp; rotational angle detecting means (18, 20) for detecting a rotational angle of the reflecting mirror and the light-shielding drum; and control means (40, 46) for controlling, according to the rotational angle detected by the rotational angle detecting means, the rotational driving of the reflecting mirror and the light-shielding drum (6) caused by the stepping motor 14; wherein any of a plurality of irradiation ports is selectively irradiated through the light emission port of the light-shielding drum with the light reflected by the reflecting mirror.

7 Claims, 3 Drawing Sheets

SPOTLIGHT SOURCE APPARATUS

TECHNICAL FIELD

The present invention relates to a spot light source apparatus for selectively irradiating a plurality of irradiation ports with light.

BACKGROUND ART

Spot light source apparatus have conventionally been configured such that they comprise a light-collecting mirror for collecting light emitted from a lamp, whereas the light collected by the light-collecting mirror is made incident on an end portion of a fiber bundle inserted in a fiber insertion slot. Also, such a spot light source apparatus comprises a shutter plate for keeping the light collected by the light-collecting mirror from being incident on the end portion of the fiber bundle, which turns ON/OFF the light incident on the end portion of the fiber bundle. As a conventional spot light source apparatus, one disclosed in Japanese Patent Publication No. HEI 5-22212 also exists.

In the above-mentioned spot light source apparatus, a rotary solenoid is used for driving the shutter plate. Since the rotary solenoid operates by converting a magnetic force into a rotational motion, its operating noise is loud. Also, large vibrations occur when the shutter plate is operated, whereby screws are likely to come loose, for example, thus causing reliability to lower upon long-time driving, and so forth.

Also, during when light emitted from the lamp is turned OFF by the shutter plate, this light is wasted, whereby the emitted light cannot be utilized effectively.

Further, in the case where the quantity of light incident on the end portion of the fiber bundle is to be adjusted, it is necessary for the optical path to be particularly provided with a stop mechanism or the like, and a motor or the like for driving this stop mechanism is also needed.

It is an object of the present invention to provide a spot light source which can effectively utilize light emitted from a discharge lamp.

DISCLOSURE OF THE INVENTION

The present invention comprises a discharge lamp for emitting light; a cold mirror, having an opening portion, for reflecting the light emitted from the discharge lamp; a reflecting mirror, located on the opening portion side of the cold mirror, for reflecting the light reflected by the cold mirror; a shielding member having a light emission port for emitting the light reflected by the reflecting mirror; rotary driving means for driving the reflecting mirror and the shielding member to rotate about an optical axis of the discharge lamp; rotational angle detecting means for detecting a rotational angle of the reflecting mirror and the shielding member caused by the rotary driving means; and control means for controlling, according to the rotational angle detected by the rotational angle detecting means, the rotational driving of the reflecting mirror and the shielding member caused by the rotary driving means; wherein any of a plurality of irradiation ports is selectively irradiated through the light emission port of the shielding member with the light reflected by the reflecting mirror.

In accordance with the present invention, as the shielding member and the reflecting mirror are integrally driven by the rotary driving means to rotate about the optical axis of the discharge lamp, an irradiation port for emitting light can be selected from a plurality of irradiation ports. In this case, the irradiation ports other than the selected one are shielded with the shielding member, whereby scattered light and the like can be prevented from being incident thereon.

BEST MODE FOR CARRYING OUT THE INVENTION

Figure 1:
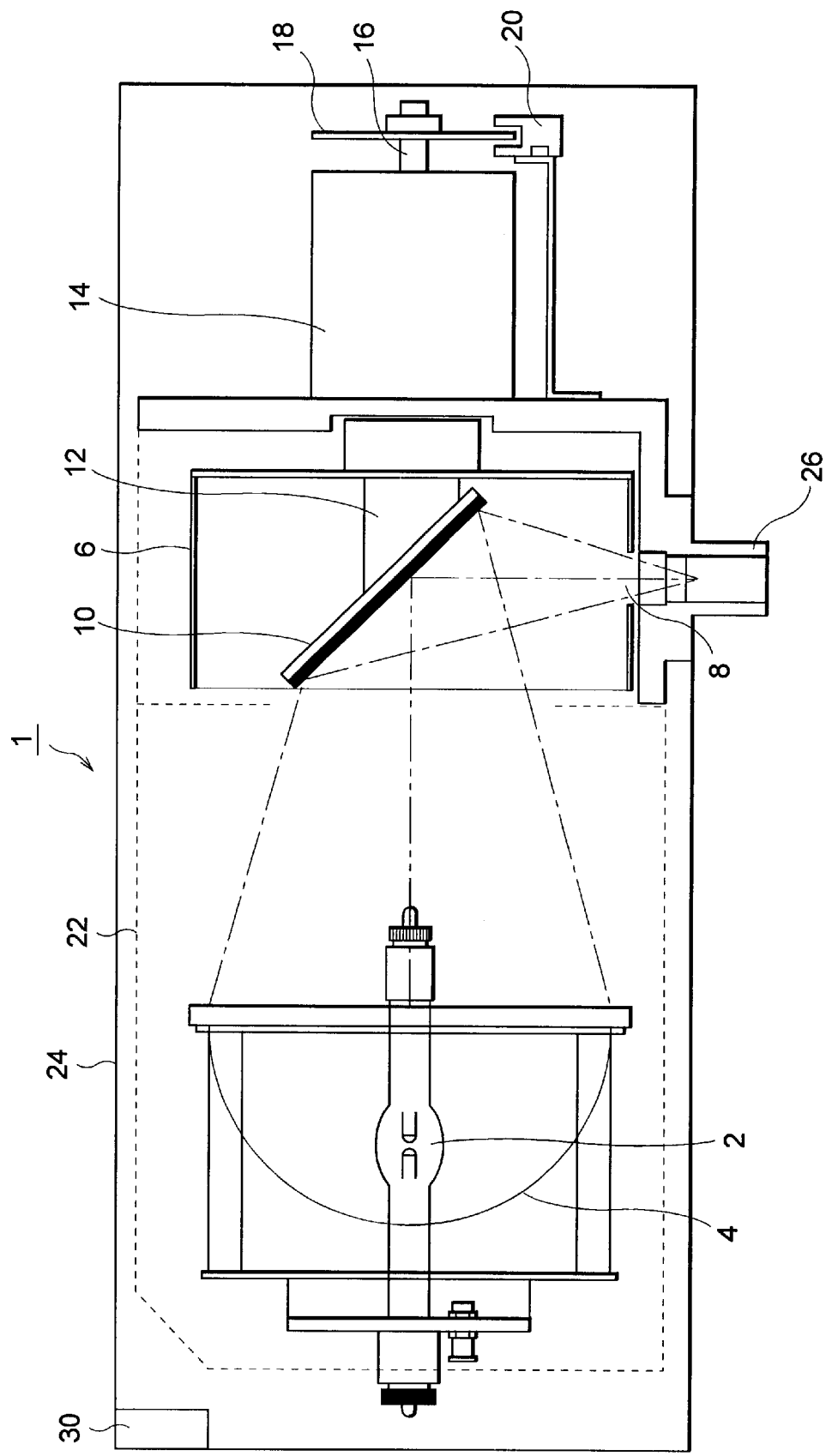
FIG. 1 is a schematic configurational view of a UV spot light source apparatus in accordance with the present invention.

In the following, a UV spot light source apparatus in accordance with an embodiment of the present invention will be explained with reference to drawings. FIG. 1 is a schematic configurational view of the UV spot light source apparatus 1.

In this drawing, numeral 2 indicates a both-end-sealing type discharge lamp adapted to emit ultraviolet light. This discharge lamp 2 is disposed inside a cold mirror 4 having an opening portion directed rightward in FIG. 1, so that the ultraviolet light emitted by the discharge lamp 2 is reflected by the inner face of the cold mirror 4 toward the opening portion.

On the other hand, numeral 6 in the drawing indicates a light-shielding drum having a cylindrical form with one closed end, whereas the side wall of this light-shielding drum (shielding member) 6 is formed with one light emission port 8 for emitting the ultraviolet light. The light-shielding drum 6 is installed such that its opening portion side is positioned on the discharge lamp 2 side, whereas a reflecting mirror 10 having a rectangular plate form is disposed within the cylinder of the light-shielding drum 6. One end of a reflecting mirror attachment shaft 12 is connected to the rear face of the reflecting mirror 10, whereas the other end of the reflecting mirror attachment shaft 12 is secured to the bottom portion of the light-shielding drum 6. The reflecting mirror 10 is arranged with an angle of 45 degrees with respect to the optical axis of the discharge lamp 2, so that the ultraviolet light reflected by the cold mirror 4 is constantly reflected toward the light emission port 8 of the light-shielding drum 6.

Also, a stepping motor 14 is disposed on the right side of the light-shielding drum 6, so as to integrally rotate the reflecting mirror 10 and the light-shielding drum 6. A position detecting plate 18 is connected to the driving shaft 16 of the stepping motor 14, and a position detecting sensor 20 for detecting the amount of rotation of the position detecting plate 18 is also provided.

The position detecting plate 18 is constituted by a disk-shaped member and has a position detecting hole (not depicted) at a position corresponding to the origin 32 (see FIGS. 2 and 3) in the direction of rotation of the reflecting mirror 10. The position detecting sensor 20 is constituted by a light-detecting sensor and, by detecting the light passing through the position detecting hole of the position detecting plate 18, senses that the reflecting mirror 10 is oriented to the origin 32 in the direction of rotation.

Disposed around the above-mentioned discharge lamp 2 and cold mirror 4 is a light-shielding plate 22 for blocking the ultraviolet light so as to prevent unnecessary ultraviolet light from leaking out of the apparatus. Also, the discharge lamp 2, cold mirror 4, light-shielding drum 6, reflecting mirror 10, stepping motor 14, position detecting plate 18, position detecting sensor 20, and the like are accommodated within a housing 24. The side wall of the housing 24 is provided with two irradiation ports (fiber insertion slots) 26, 28, so that the ultraviolet light can selectively be emitted from these two irradiation ports 26, 28 as the reflecting mirror 10 is rotated (see FIGS. 2 and 3).

Figure 2:
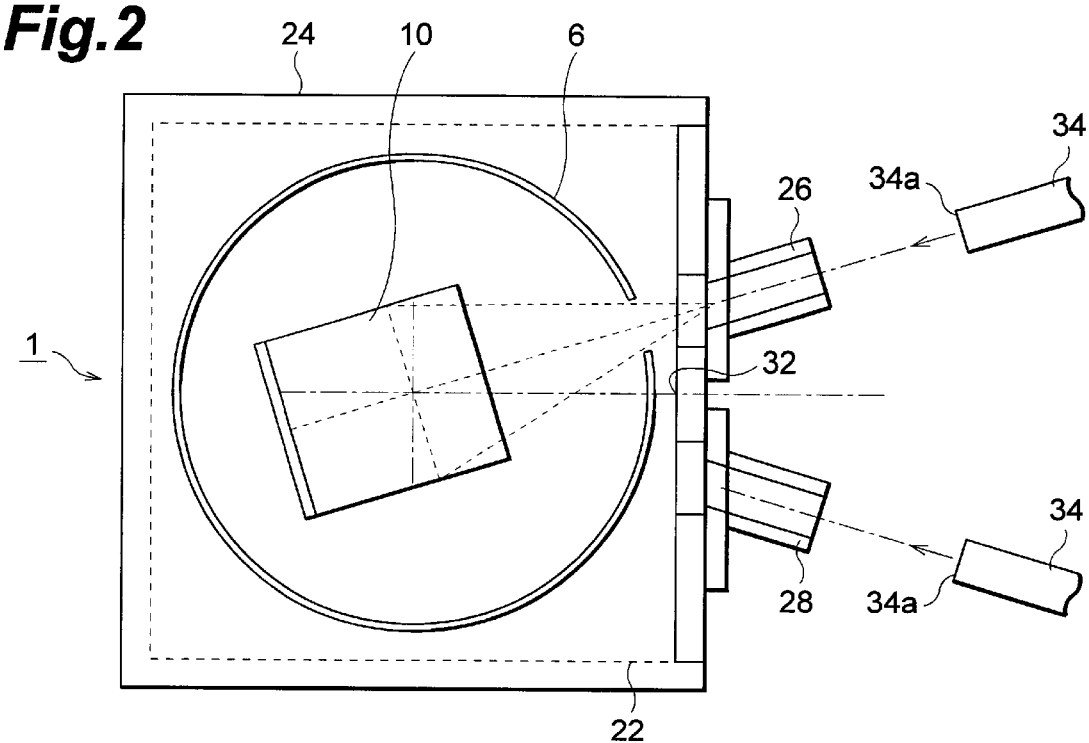
FIG. 2 is a view for explaining a state of rotation of a reflecting mirror in the UV spot light source apparatus in accordance with the present invention.
Figure 3:
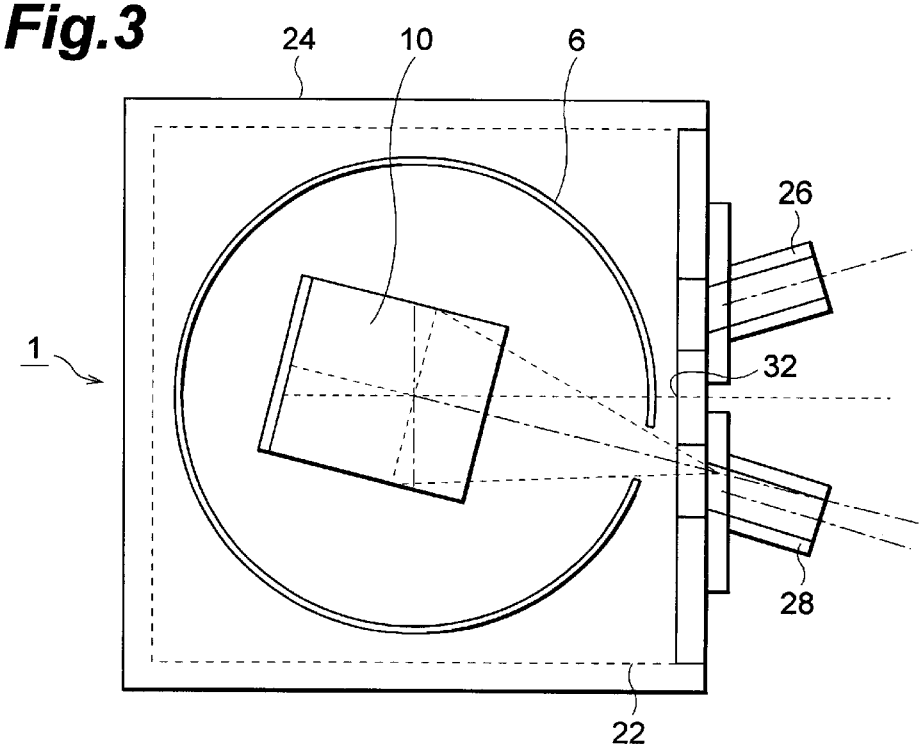
FIG. 3 is a view for explaining a state of rotation of the reflecting mirror in the UV spot light source apparatus in accordance with the present invention.

Here, as shown in FIGS. 2 and 3, the irradiation ports 26, 28 are disposed so as to be inclined with respect to the side wall of the housing 24. Namely, the irradiation ports 26, 28 are formed in the side wall of the housing 24 such that the respective center axes of the irradiation ports 26, 28 align with their corresponding optical axes of the ultraviolet light reflected by the reflecting mirror 10.

As shown in FIG. 2, one end portion 34a of an optical fiber bundle 34 is inserted into each of the irradiation ports 26, 28, so as to be directed toward the reflecting mirror 10. While ultraviolet light having a larger quantity of light in its marginal portions and a smaller quantity of light in its center portion is incident on the end portion 34a of the optical fiber bundle 34 inserted into the irradiation port 26, 28 due to characteristics of the both-end-sealing type discharge lamp 2, the optical fiber bundle 34 employed here is one in which individual optical fibers constituting the optical fiber bundle 34 complicatedly cross each other between the entrance end and the exit end so as to emit uniform ultraviolet light.

Provided in the left end portion within the housing 24, i.e., on the outer face side of the cold mirror 4, is a cooling fan 30 which aspirates the air taken in through air inlets formed in the housing 24 in the vicinity of the discharge lamp 2 and cold mirror 4 and in the vicinity of the stepping motor 14. Hence, the air taken in through the air inlets is let out of the housing 24 through the light-shielding plate 22 and the housing 24, so that the light-shielding plate 22 is cooled with the air, whereby the electrodes of the discharge lamp 2, the cold mirror 4, and the like disposed inside the light-shielding plate 22 are indirectly cooled.

Figure 4:
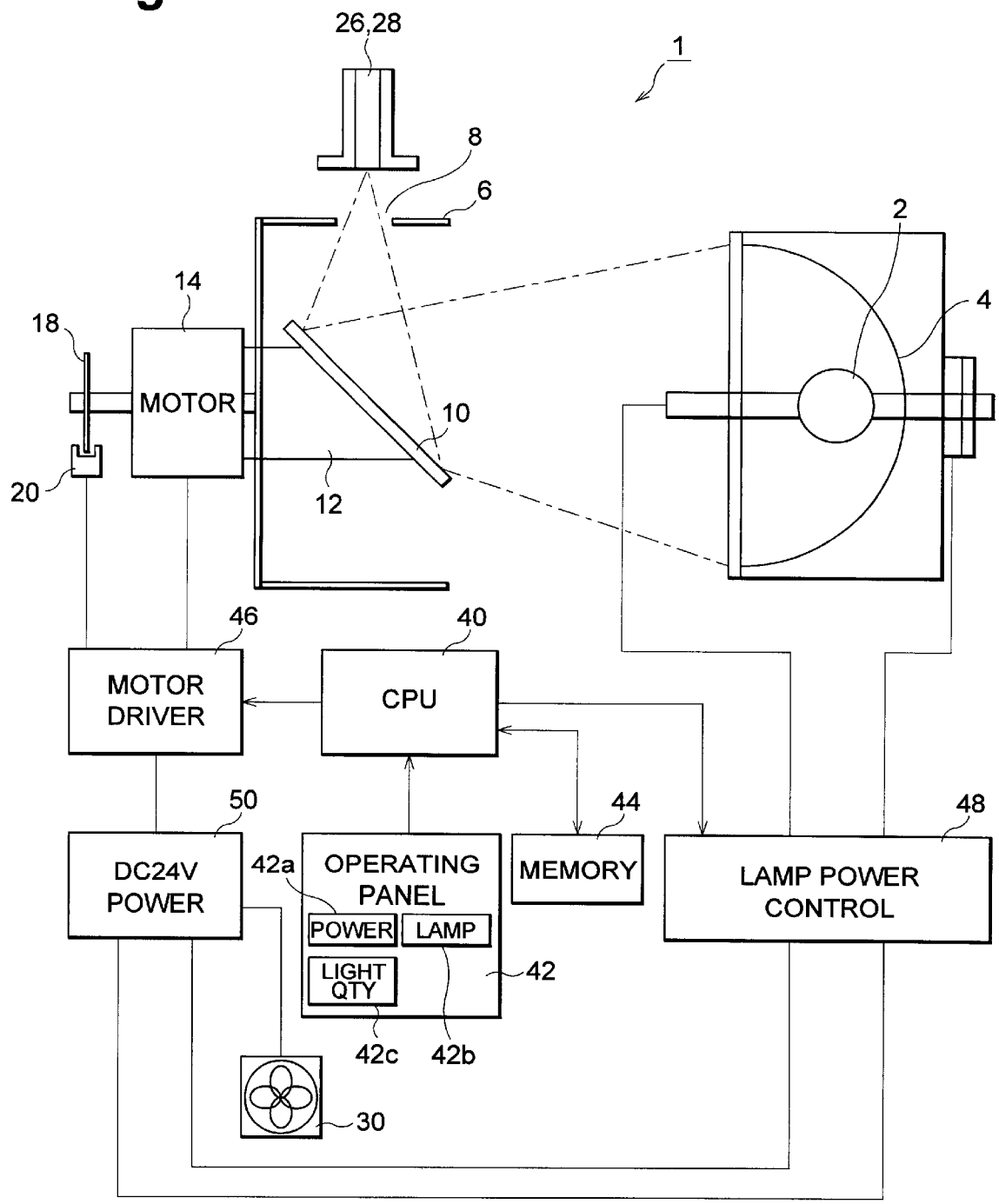
FIG. 4 is a block diagram of the UV spot light source apparatus in accordance with the present invention.

FIG. 4 is a block diagram of the UV spot light source apparatus 1. A central processing unit (CPU) 40 controls the UV spot light source apparatus 1 as a whole, whereas an operating panel 42, a memory 44, a motor driver 46, and a lamp power control section 48 are connected to the CPU 40.

The operating panel 42 is provided with a power switch 42a for supplying power to the UV spot light source apparatus 1, a lamp switch 42b for lighting the discharge lamp 2, a light quantity switch 42c for setting the quantity of light of ultraviolet rays emitted from the irradiation ports 26, 28, and the like. Also, the memory 44 stores therein set values for the quantity of light of ultraviolet rays emitted from the irradiation ports 26, 28, and the like.

Here, the quantity of light of ultraviolet rays emitted from the irradiation ports 26, 28 is set by operations of the light quantity switch 42c in the operating panel 42 and the like. For example, in the case where 100% and 50% of light quantity of ultraviolet light are set to be emitted from the irradiation ports 26, 28, respectively, the light quantity switch 42c is operated so as to specify 100% and 50% for the irradiation ports 26, 28, respectively, whereby the CPU 40 calculates the respective amounts of rotation necessary for the stepping motor 14 to emit 100% of light quantity of ultraviolet light from the irradiation port 26 and 50% of light quantity of ultraviolet light from the irradiation port 28, and thus calculated amounts are stored in the memory 44.

The motor driver 46 controls the driving of the stepping motor 14; and, when the power switch 42a of the operating panel 42 is turned ON, it supplies power to the stepping motor 14 from a DC 24-V power source 50 connected to an AC power source (not depicted), thereby starting driving the stepping motor 14. The lamp power control section 48 controls the supply of power to the discharge lamp 2 according to a control signal from the CPU 40. Here, the DC 24-V power source 50 also supplies power to the cooling fan 30.

Operations of the UV spot light source apparatus 1 will now be explained. First, when the power switch 42a of the operating panel 42 is turned ON, then the motor driver 46 starts supplying power to the stepping motor 14 from the DC 24-V power source 50. As the stepping motor 14 is driven, a process for rotating the reflecting mirror 10 and the light-shielding drum 6 and confirming the origin 32 in the direction of rotation of the reflecting mirror 10 is carried out.

Namely, the reflecting mirror 10 and the light-shielding drum 6 are rotated by the stepping motor 14 and, after the position detecting hole of the position detecting plate 18 is detected by the position detecting sensor 20 (at a predetermined position after passing the position detecting hole), the rotation of the reflecting mirror 10 and light-shielding drum 6 by the stepping motor 14 is stopped. Thereafter, the stepping motor 14 is rotated in increments of one step, and the rotation of the reflecting mirror 10 and light-shielding drum 6 by the stepping motor 14 is stopped at the position where the position detecting hole of the position detecting plate 18 is detected by the position detecting sensor 20.

Until this process for confirming the origin 32 in the direction of rotation of the reflecting mirror 10 is completed, i.e., until the reflecting mirror 10 is oriented to the home position (origin) 32, no power is supplied from the lamp power control section 48 to the discharge lamp 2 under the control of the CPU 40 even when the lamp switch 42b is operated.

Therefore, when the lamp switch 42b of the operating panel 42 is operated after the process of confirming the origin 32 in the direction of rotation of the reflecting mirror 10 is completed, the power from the DC 24-V power source 50 is supplied to the discharge lamp 2 under the control of the lamp power control section 48, whereby the discharge lamp 2 is lit.

In the case where ultraviolet light is to be guided to the end portion 34a of the optical fiber bundle 34 inserted in the irradiation port 26, the stepping motor 14 is rotated toward the irradiation port 26 under the control of the CPU 40 according to the amount of rotation of the stepping motor 14 stored in the memory 44, so that the light emission port 8 of the light-shielding drum 6 aligns with the position of the irradiation port 26 (see FIG. 2). As a consequence, the ultraviolet light reflected by the reflecting mirror 10 is guided to the end portion 34a of the optical fiber bundle 34 inserted in the irradiation port 26. At this time, the end portion 34a of the optical fiber bundle 34 inserted in the irradiation port 28 is shielded from light with the light-shielding drum 6, whereby the ultraviolet light would not be guided to the end portion 34a of the optical fiber bundle 34.

In the case where ultraviolet light is to be guided to the end portion 34a of the optical fiber bundle 34 inserted in the irradiation port 28, it is necessary that the light-shielding drum 6 and the reflecting mirror 10 be rotated such that the position of the light emission port 8 of the light-shielding drum 6 is moved to the position of the irradiation port 28. Namely, under the control of the CPU 40, the stepping motor 14 is rotated toward the irradiation port 28 according to the amount of rotation of the stepping motor 14 stored in the memory 44, so that the light emission port 8 of the light-shielding drum 6 aligns with the position of the irradiation port 28 (see FIG. 3).

Here, FIG. 3 shows the state where the center axis of the irradiation port 28 and the optical axis of the ultraviolet light reflected by the reflecting mirror 10 deviate from each other, so as to narrow the ultraviolet light emitted from the irradiation port 28. Due to this rotation of the reflecting mirror 10, the ultraviolet light reflected by the reflecting mirror 10 is guided to the end portion 34a of the optical fiber bundle 34 inserted in the irradiation port 28.

When the light emission port 8 of the light-shielding drum 6 is located between the irradiation port 26 and the irradiation port 28 while moving to the irradiation port 28, both of the end portion 34a of the optical fiber bundle 34 inserted in the irradiation port 26 and the end portion 34a of the optical fiber bundle 34 inserted in the irradiation port 28 are shielded from light with the light-shielding drum 6, whereby the ultraviolet light would not be guided to the end portion 34a of each optical fiber bundle 34.

According to the UV spot light source apparatus 1 of this embodiment, since the discharge lamp 2 is controlled so as not to be lit until the process for confirming the origin 32 in the direction of rotation of the reflecting mirror 10 is completed, unnecessary ultraviolet light can be prevented from being guided to the optical fiber bundles 34, whereby the safety during the time when the discharge lamp 2 is lit can be improved.

As the light-shielding drum 6 and the reflecting mirror 10 are integrally rotated, ultraviolet light can selectively be guided to the end portion 34a of the fiber bundle 34 inserted in the irradiation port 26 or irradiation port 28, whereby the ultraviolet light emitted from the discharge lamp 2 can be utilized effectively. Also, since both of the end portions 34a of the optical fiber bundles inserted in the irradiation port 26 and irradiation port 28 are shielded with the light-shielding drum 6 in the state where the ultraviolet light irradiates the area between the irradiation port 26 and the irradiation port 28, i.e., the inner wall of the housing 24, the light-shielding drum 6 can also act as a shutter mechanism.

Also, since the respective light quantities of ultraviolet rays emitted from the irradiation ports 26, 28 can be set in the UV spot light source apparatus 1 in accordance with this embodiment, one UV spot light source apparatus 1 can be used for curing two kinds of adhesive resins, for example. Namely, there are cases where different adhesive resins are employed in two respective manufacture lines, whereby appropriate quantities of ultraviolet light are needed for irradiating the respective adhesive resins so as to cure them.

Hence, when the quantities of light of ultraviolet rays emitted from the irradiation ports 26, 28 are set to those appropriate for curing their respective adhesive resins, the UV spot light source apparatus 1 can be used for curing two kinds of adhesive resins. This UV spot light source apparatus 1 can also be used for applying two different adhesive resins to their respective portions of a product traveling through one production line.

Since the quantity of light of the discharge lamp 2 decreases with time, the ultraviolet light is guided while the light emission port 8 of the light-shielding drum 6 deviates from the position of the end portion 34a of the optical fiber bundle 34 inserted in the irradiation port 26, 28 at the time when the discharging of the discharge lamp 2 is started, and then the amount of deviation is reduced as the quantity of light of the discharge lamp 2 decreases, whereby a predetermined quantity of ultraviolet light can constantly be guided to the fiber bundle 34.

Further, in the UV spot light source apparatus 1 in accordance with this embodiment, since the light-shielding drum 6 and the reflecting mirror 10 are rotated by the stepping motor 14 so as to select the fiber bundle 34 to which the ultraviolet light is guided, vibrations and shocks can be reduced, whereby operating noise can be lowered, and the loosening of screws due to vibrations and the like can be made less likely to occur.

Though a discharge lamp emitting ultraviolet light is employed as the discharge lamp 2 in the UV spot light source 1 in accordance with the above-mentioned embodiment, discharge lamps which emit light, such as bluish visible light, other than the ultraviolet light can also be used without being restricted to the above-mentioned embodiment. In this case, the use as the spot light source apparatus for curing adhesive resins can be diversified.

Though the optical fiber bundles 34 are inserted into the irradiation ports 26, 28 as a light guide, a liquid light guide can also be used without being restricted to the optical fiber bundles 34. Here, the liquid light guide is a light guide whose inside is filled with a liquid, in which the liquid is configured to have a refractive index higher than that of its surrounding solid. Since the liquid light guide does not have so many cores and claddings as the optical fiber bundle does, it yields a favorable transmissivity, thereby being able to effectively utilize the emitted light.

Though the light-shielding drum 6 has a cylindrical form in the UV spot light source apparatus 1 in accordance with the above-mentioned embodiment, without being restricted thereto, a planar light-shielding plate can also be used. In this case, it is necessary for the planar light-shielding plate to have such a width that a plurality of irradiation ports (fiber insertion slots) formed in the outer wall of the housing of the UV spot light source apparatus are blocked at the same time. As a consequence, the scattered light and leaking light from the discharge lamp 2 can be prevented from unnecessarily being incident on the fiber bundles 34.

Also, in the above-mentioned embodiment, a light-detecting sensor may be disposed at the inner wall face of the housing 24 between the irradiation port 26 and the irradiation port 28 so as to detect the life end of the discharge lamp 2. In this case, when the reflecting mirror 10 and the light-shielding drum 6 are rotated such that the light emission port 8 reaches the position of the light-detecting sensor, the latter detects the intensity of the ultraviolet light from the discharge lamp 2. Further, the intensity of the ultraviolet light from the discharge lamp 2 detected by this light-detecting sensor can be used for adjusting the quantity of light.

Though the housing 24 is provided with two irradiation ports (fiber insertion slots) in the above-mentioned embodiment, without being restricted thereto, three or more irradiation ports can be provided.

Industrial Applicability

As explained in the foregoing, the spot light source apparatus in accordance with the present invention is suitably employable for curing adhesive resins used in product manufacturing lines and the like, for example.

What is claimed is:

1. A spot light source apparatus comprising:
   a discharge lamp for emitting light;
   a cold mirror, having an opening portion, for reflecting the light emitted from said discharge lamp;

a reflecting mirror, located on the opening portion side of said cold mirror, for reflecting the light reflected by said cold mirror;

a shielding member having a light emission port for emitting the light reflected by said reflecting mirror;

rotary driving means for driving said reflecting mirror and said shielding member to rotate about an optical axis of said discharge lamp;

rotational angle detecting means for detecting a rotational angle of said reflecting mirror and said shielding member caused by said rotary driving means; and control means for controlling, according to the rotational angle detected by said rotational angle detecting means, the rotational driving of said reflecting mirror and said shielding member caused by said rotary driving means;

wherein any of a plurality of irradiation ports is selectively irradiated through said light emission port of said shielding member with the light reflected by said reflecting mirror.

2. A spot light source apparatus according to claim 1, wherein a light guide for guiding the light emitted through said light emission port of said shielding member is connected to said irradiation port.

3. A spot light source apparatus according to claim 2, wherein said light guide is an optical fiber bundle.

4. A spot light source apparatus according to claim 2, wherein said light guide is a liquid light guide.

5. A spot light source apparatus according to claims 1, further comprising a housing within which said shielding member is disposed, a wall face of said housing being provided with said irradiation port such that a center axis of said light guide and an optical axis of said light reflected by said reflecting mirror align with each other.

6. A spot light source apparatus according to claim 1, wherein said shielding member has a cylindrical form with one said light emission port.

7. A spot light source apparatus according to claim 1, further comprising a cooling device disposed on an upper side of said discharge lamp.

* * * * *